US011386766B2

(12) United States Patent
Gregg

(10) Patent No.: US 11,386,766 B2
(45) Date of Patent: *Jul. 12, 2022

(54) SYSTEM FOR DETECTING FALLS AND DISCRIMINATING THE SEVERITY OF FALLS

(71) Applicant: FALLCALL SOLUTIONS, LLC, Trumbull, CT (US)

(72) Inventor: Shea C. Gregg, Trumbull, CT (US)

(73) Assignee: FALLCALL SOLUTIONS, LLC, Trumbull, CT (US)

( * ) Notice: Subject to any disclaimer, the term of this patent is extended or adjusted under 35 U.S.C. 154(b) by 46 days.

This patent is subject to a terminal disclaimer.

(21) Appl. No.: 16/987,846

(22) Filed: Aug. 7, 2020

(65) Prior Publication Data

US 2020/0372778 A1 Nov. 26, 2020

Related U.S. Application Data

(63) Continuation of application No. 16/685,732, filed on Nov. 15, 2019, now Pat. No. 10,741,046, which is a continuation of application No. 16/174,105, filed on Oct. 29, 2018, now Pat. No. 10,482,744, which is a continuation of application No. 15/405,170, filed on Jan. 12, 2017, now Pat. No. 10,147,296.

(Continued)

(51) Int. Cl.
*G08B 21/04* (2006.01)
*H04B 1/3827* (2015.01)
*H04L 67/50* (2022.01)
*G08B 25/00* (2006.01)

(52) U.S. Cl.
CPC ....... *G08B 21/043* (2013.01); *G08B 21/0446* (2013.01); *G08B 25/001* (2013.01); *H04B 1/385* (2013.01); *H04L 67/22* (2013.01)

(58) Field of Classification Search
CPC ......................... G08B 21/043; G08B 21/0446; G08B 25/001; H04B 1/385; H04L 67/22
USPC ................................................... 340/539.11
See application file for complete search history.

(56) References Cited

U.S. PATENT DOCUMENTS

| 8,217,795 B2 * | 7/2012 | Carlton-Foss | ....... | A61B 5/0024 340/573.1 |
| 10,741,046 B2 * | 8/2020 | Gregg | .................. | G08B 25/001 |

(Continued)

*Primary Examiner* — Quan Zhen Wang
*Assistant Examiner* — Mancil Littlejohn, Jr.
(74) *Attorney, Agent, or Firm* — Perman & Green, LLP

(57) ABSTRACT

A system for detecting and discriminating the severity of a fall includes a mobile device configured to communicate a network, a notification module, and a wearable device configured to communicate with the mobile device, the wearable device including a fall monitor and an activity log resident on the wearable device, where the fall monitor is configured to record detected movement on the activity log. The notification module is configured to effect a selectable setting of a rate of communication between the mobile device and the wearable device based on at least part of a predetermined pattern of a fall discriminator within the activity log, where the selectable setting defines a predetermined period of communication between the mobile device and the wearable device. The fall discriminator is configured to determine when the activity log includes a notable fall event based on the predetermined pattern.

36 Claims, 5 Drawing Sheets

Related U.S. Application Data

(60) Provisional application No. 62/277,853, filed on Jan. 12, 2016.

(56) References Cited

U.S. PATENT DOCUMENTS

| | | | |
|---|---|---|---|
| 2012/0314901 A1* | 12/2012 | Hanson | G08B 21/02 382/103 |
| 2017/0249823 A1* | 8/2017 | Espinoza | A61B 5/1117 |

* cited by examiner

SYSTEM FOR DETECTING FALLS AND DISCRIMINATING THE SEVERITY OF FALLS

RELATED APPLICATIONS

This application is a continuation of U.S. patent application Ser. No. 16/685,732, filed Nov. 15, 2019, which is a continuation of U.S. patent application Ser. No. 16/174,105, filed on Oct. 29, 2018, (now U.S. Pat. No. 10,482,744) which is a continuation of U.S. patent application Ser. No. 15/405,170, filed on Jan. 12, 2017, (now U.S. Pat. No. 10,147,296), which is a non-provisional of and claims the benefit of U.S. Provisional Patent Application No. 62/277,853 filed Jan. 12, 2016, the disclosures of which are incorporated herein by reference in their entireties.

FIELD

The present embodiments relate a system for detecting falls, more particularly, a system for discriminating the severity of falls.

BACKGROUND

Accidental falls and slips are significant contributors to injuries and, potentially, death, among the elderly and the sick. In many cases, falls can result in broken bones, head injuries or other injuries such as sprains or ligament tears. Annually, 2.5 million Americans are treated in an emergency room for fall-related injuries and up to 700,000 Americans are hospitalized each year for serious injuries stemming from head injuries or hip fractures. Adjusted for inflation, direct medical costs arising from injuries from a fall result in nearly $3.4 billion dollars annually, most of which are hospital costs. While prior art fall detection systems exist, the prior art systems often are subject to several disadvantages. Some prior art systems include a fall detection system on a wearable device or fall monitor device that run continuously in the foreground of wearable device or fall monitor device processor. These prior art systems are capable of continuously detecting fall events in substantially real time. However, in these prior art systems, wearable devices or fall monitoring devices are always "awake" and devote substantial processing resources to the fall detection system. This is a burden on the battery life of wearable devices or fall monitoring devices, and increase downtime due to frequent recharges, thereby reducing the effectiveness of the monitoring system. Other prior art systems rely on accelerometer data from mobile phones or smart phones, typically kept in a pocket or on a belt holster, to detect fall events or fall injuries. However, these solutions are also imperfect. Mobile phones aren't always kept on the body at all times, thus limiting the time during which fall detection and monitoring can be active.

BRIEF DESCRIPTION OF THE DRAWINGS

The foregoing aspects and other features of the present disclosed embodiment are explained in the following description, taken in connection with the accompanying drawings, wherein.

DETAILED DESCRIPTION OF THE EXEMPLARY EMBODIMENTS

Figure 1:
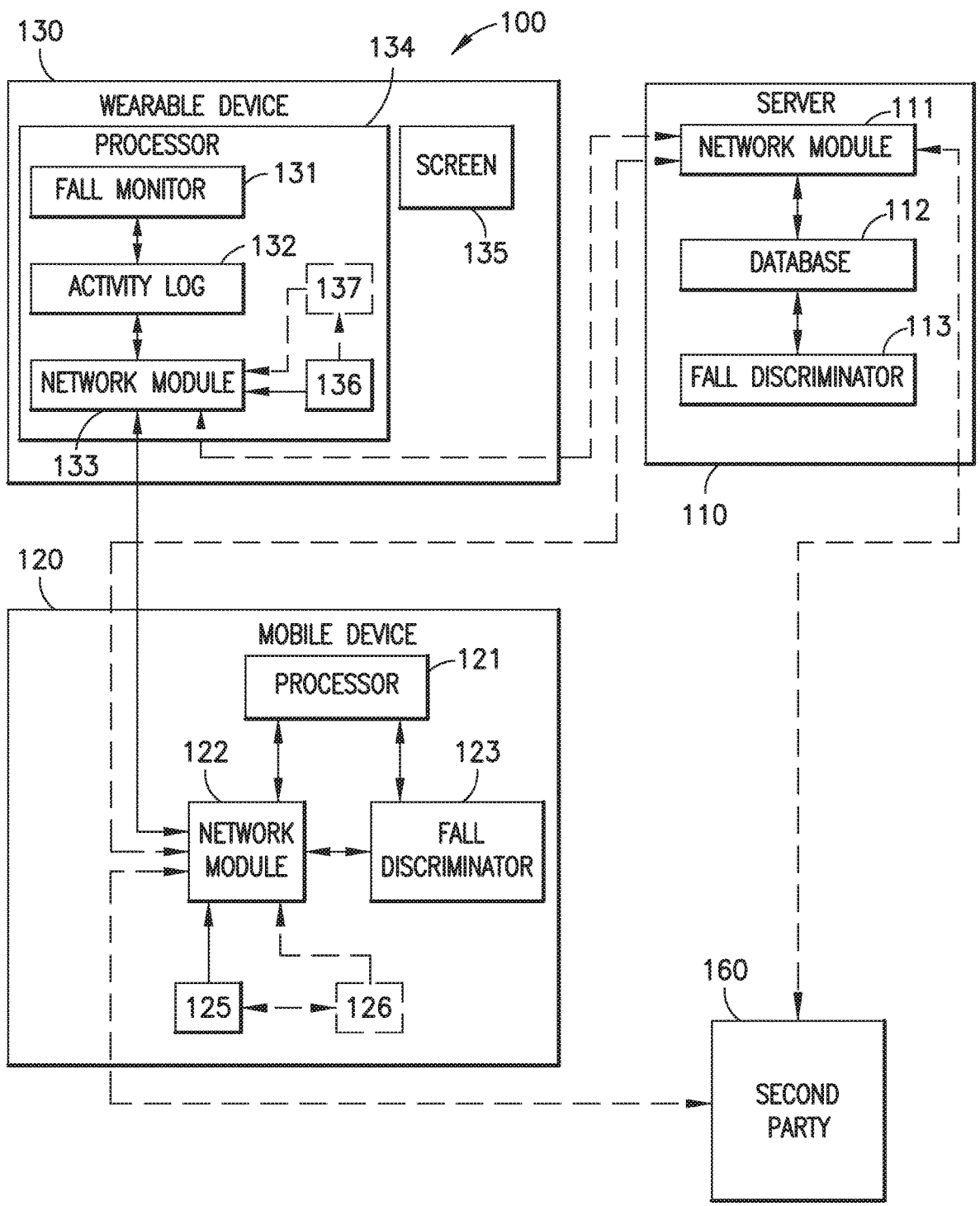
FIG. 1 is a schematic representation illustrating an overview of the system for detecting falls and discriminating the severity of falls according to one aspect of the present disclosure.

FIG. 1 illustrates an exemplary schematic diagram illustrating the system. Although the present invention will be described with reference to the embodiment shown in the drawings, it should be understood that the present exemplary embodiments can be used individually or in any suitable combination thereof. Although the aspects of the disclosed embodiment will be described with reference to the drawings, it should be understood that the aspects of the disclosed embodiment can be embodied in many alternate forms. In addition, any suitable size, shape or type of elements or materials could be used.

Referring to FIG. 1, an exemplary block diagram illustrating the fall detection and discrimination system 100 is shown. In one aspect, the fall detection and discrimination system 100 includes a server 110, a wearable device 130 and a mobile device 120. In one aspect, the mobile device 120 is in communication with the wearable device 130. In another aspect, the server 110 is also in communication with the wearable device 130. In one aspect, both the mobile device 120 and the server 110 are further in communication (shown in phantom) with a second party 160.

The server 110 includes a fall discriminator 113, a network module 111 and a database 112. The mobile device 120 includes a processor 121, a network module 122 which is communicable with the network module 111 of the server 110, a fall discriminator 123 and a database 124. In one aspect, the mobile device 120 also includes a notification module 125, the operation of which is described in greater detail below. In one aspect, the mobile device 120 also includes an intervening module 126. The wearable device 130 includes a processor 134, a display 135, a fall monitor 131 configured to record detected movement to an activity log 132 resident on the wearable device, and a network module 133 which is communicable with the mobile device 120. In one aspect, the wearable device 130 also includes a notification module 135 similar to the notification module 125. In one aspect, the mobile device 120 initiates a communication with the wearable device 130 and receives the activity log 132. The mobile device 120 is also configured to discriminate, with the fall discriminator 123, when the activity log 132 includes a fall event based on a predetermined pattern defining the fall event. The mobile device 120 further discriminates, such as with the fall discriminator 123, the severity of the detected fall based on data recorded in the activity log 132.

Figure 2:
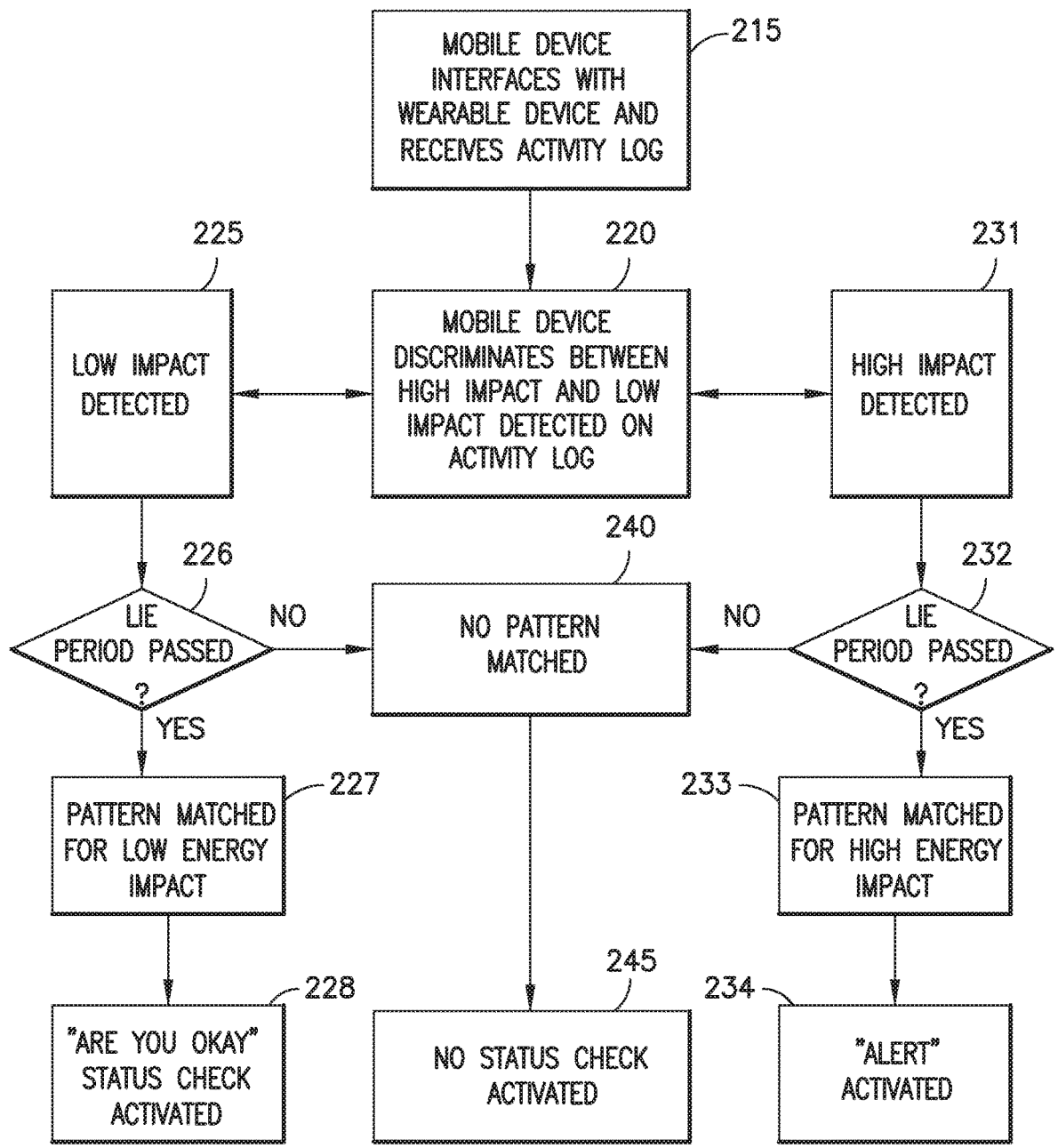
FIG. 2 is an exemplary flowchart illustrating the operation of a system for detecting falls and discriminating the severity of falls according to one aspect of the present disclosure.

Referring now to FIGS. 1 and 2, the fall detection and discrimination system 100 is shown along with an exemplary flow chart of the operation of the fall detection and discrimination system 100 includes the wearable device 130. In one aspect, the wearable device 130 is a smart watch, such as, for example, an Apple Watch®, an Android® Wear watch, a Pebble® Watch or Samsung Gear® watch. However, in other aspects, the wearable device 130 is a wearable belt, a wearable clip-on device, wearable bracelet or other smart wearable device. In one aspect, the wearable device 130 includes the fall monitor 131. In one aspect, the fall monitor 131 is configured to detect motion, falls, acceleration, G-forces and/or impacts. In one aspect, the fall monitor 131 includes a multi-axis accelerometer, such as, for example, a 3-axis accelerometer capable of measuring the magnitude of acceleration along 3 axes. In other aspects, the fall monitor 131 also includes gyroscopes or inertial measurement units. In yet other aspects, the fall monitor 131 includes integrated barometers for detecting transitions in height or barometric pressure. In one aspect, the fall monitor 131 is configured to wake upon detection of an acceleration, a displacement or a movement by the fall monitor 131, which initiates recording on the activity log 132. In another aspect, the fall monitor 131 is substantially continuously recording or operating in the background at all relevant times (e.g., no or limited foreground processing power is used to continuously record or register data from the fall monitor 131) as to effect real-time or near real-time detection of activity including activities discernible as fall events. The wearable device 130 further includes the activity log 132 resident on the wearable device 130 which records, in near real-time, the selected activity data (including magnitude, timing, duration of action and inactivity) from the recorded data from the fall monitor 131.

In one aspect, the activity log 132 includes data records or registers data from the fall monitor 131 which includes a record of one or more detected falls and detected lie states. A fall is, in one aspect, a detected movement, acceleration or displacement detected by the fall monitor 131. In one aspect, the falls recorded by the fall monitor 131 can be categorized as high mechanical motions or low mechanical motions according to, for example, a detected acceleration, deceleration or impact. A detected lie state is, in one aspect, a period of low movement detected by the fall monitor 131. The detected lie state is, in one aspect, a state of the user following a detected fall event (which can include, e.g. one or more of a fall action, a detected impact and at least some lie state, in a predetermined pattern, magnitude and duration) recorded by the fall monitor 131, representing the user lying on the ground. In one aspect, the fall monitor 131 further is further configured to provide discrimination of position, particularly as it relates to, for example, the relative height of the wearable device 130. In one aspect, the fall monitor 131 can discriminate between the activity and/or the body position, pose or orientation of a wearer. For example, the fall monitor 131 can discriminate between standing, sitting or lying positions as well as any changes to these positions such as jumping, falling, running or slipping. In one aspect, the fall monitor 131 is also tuned or configured to filter sensor data to a predetermined level, so that fall monitor 131 data record is definitive of activity indicative and consistent with fall events, as well as indicative of the before and after state of a wearer associated with the fall event (e.g. the state of a wearer before and after the fall event). For example, the fall monitor 131 can, in one aspect, detect and discriminate the state of a wearer prior to the detected impact (e.g. lying down, sitting, walking, or running) and the state of the wearer following the detected impact (e.g. getting up or lying down in a lie state).

In one aspect, the activity log 132 also includes one or more lie periods recorded by the fall monitor 131. Generally, a lie period is a period of time a fallen individual is detected to be in the lie state (e.g. a wearer is lying, or otherwise inactive in a collapsed position, on the ground or other lying surface) following a detected fall event. As noted previously, the fall event may be one or more activity or pattern of activities as registered on the activity log 132. This can include, for example, a fall activity, an impact and a lie state. After a predetermined lie period following a detected fall event has passed and the wearer is still in a lie state, a fall event may further be discriminated between a non-severe and a severe fall (described in further details below).

In one aspect, the wearable device 130 includes the notification module 136 which is configured to effect a selectable setting for controlling a rate of communication by the network module 133 between the wearable device 130, the mobile device 120 and/or the server 110. In one aspect, the rate of communication also controls the rate of communication between the notification module 136 and the activity log 132 on the wearable device 130. The selectable setting further defines a predetermined period between communications between, for example, the wearable device 130, the mobile device 120 and/or the server 110. By controlling the rate of communication of the network module 133, the notification module 136 improves system operation and performance by, for example, by conserving battery life of the mobile device 120 and the wearable device 130 (e.g. by reducing the rate of communication between the wearable device 130 and the mobile device 120), reducing data transmission bandwidth and providing better communication links (e.g. for example, by minimizing processor activity on the wearable device 130, mobile device 120 and server 110; minimizing wearable device 130, mobile device 120 and server 110 processor sizes, reducing system resources and overhead on the wearable device 130, mobile device 120 and server 110, or reducing network or connectivity congestion).

In one aspect, the selectable setting for controlling the rate of communication is based on one or more predetermined patterns of fall events by a fall discriminator (e.g. the fall discriminator 123 of the mobile device 120, or fall discriminator 113 of the server 110). By receiving a selection of the selectable setting, in one aspect, the period of communication between the wearable device 130, the mobile device 120 and/or the server 110 is based at least in part on the predetermined pattern of fall or fall events used by a fall discriminator 123, 113. For example, in one aspect, the setting of the rate of communication, the selection of which is effected by the notification module 136, is based, at least in part, on a predetermined lie period following a impact detected from fall activity as part of the predetermined pattern. However, in other aspects, the rate of communication is based on other parts of the predetermined pattern. By adjusting the rate setting of communication based on at least a part of the predetermined pattern of fall event, the selectable setting of the rate of communication provides a prospective setting for the rate of communication that is tailored to the discrimination of fall events based on the predetermined patterns employed by the fall discriminators 123, 131, rather than merely reacting or responding to periods of inactivity on a wearable device 130 or mobile device 120. Moreover, such selectable setting leverages the predetermined pattern of the fall discriminator 125, 136 to increase efficiency of the system, avoiding communication during times that do not serve towards definition and discrimination of a fall.

In one aspect, the period between communications based on the selectable setting is longer than the predetermined lie period of the predetermined pattern. In one aspect, the period between communications is multiples of the predetermined lie period of the predetermined pattern. In other aspects, the period between communications is seconds or minutes longer than the predetermined lie period of the predetermined pattern. In yet other aspects, the period between communications is substantially similar or otherwise related to the predetermined lie period. Relating the period between communications to the predetermined lie period allows the mobile device 120 to further leverage the period between communications to help discriminate whether a fall is severe or not while saving battery use, or otherwise providing improved system operability as previously noted. For example, if the predetermined lie period is the same or shorter than the period between communications, when a fall is detected and a full period between communications passes indicating the user is still in a lie state on the ground, in one aspect, the mobile device 120 can quickly and efficiently discriminate the severity of the detected fall event on this basis. In other aspects, if the period between communications is shorter than the predetermined lie period, the mobile device 120 can more quickly discriminate the severity of any detected falls and respond more quickly to detected falls or injuries and facilitates a simplified discrimination algorithm by the fall discriminators 123, 113 by performing comparisons between lie time and period and immediately (within the context of processor performing the simplified comparison) to discriminates the fall event severity. The selectable setting of the rate of communication, in one aspect, further allows for the mobile device 120 and wearable device 130 to be in an inactive or sleep state for most of the time, becoming active only after the period of communication determined by the notification module 136 has passed.

In one aspect, the notification module 136 of the wearable device is configured to effect a selectable setting of the rate of communication substantially independently of a communication protocol or communication standard. For example, the Bluetooth® protocol limits the period of time assigned to sleep modes to about 65,440 slots (approximately 40 seconds). The notification module 136 is configured to provide for periods between communication that is greater than what a communication protocol like Bluetooth® provides. In one aspect, the notification module 136 is configured to disable the at least part of the network module 133 of the wearable device to achieve a lower rate of communication between the wearable device 130 and the mobile device 120 and/or the server 110. In one aspect, the notification module 136 of the wearable device is in communication with an intervening module 137 which is configured to disable at least a part of the network module 133 to accommodate a period between communication that is greater than what is permitted by the communication protocol. In yet other aspects, the notification module 136 is configured to effect a selectable setting of the rate of communication in accordance with a communication protocol or standard where there is no conflict between the communication protocol and the selectable setting of the rate of communication.

In one aspect, the wearable device 130 is in communication with the mobile device 120. Referring still to FIGS. 1 and 2, the mobile device 120 is, in one aspect, a mobile device or a smart phone such as, for example, an Apple® iPhone®, an Android® phone, a Windows® phone or a Blackberry® phone. In other aspects, the mobile device 120 is a tablet or other mobile computing device. In yet other aspects, the mobile device 120 includes fixed or stationary devices such as, for example, home monitoring stations for monitoring a user's physical condition. In one aspect, the mobile device 120 includes the notification module 125 which is configured to provide a selectable rate of communication between the mobile device 120 and the wearable device 130 substantially similarly to the notification module 136 described above. In one aspect, based on the selectable setting of the rate of communication set by the notification module 125, the mobile device 120 initiates a communication with wearable device 130 with the network module 122 and receives the activity log 132 resident on the wearable device 130 (see block 215 of FIG. 2). In one aspect, the mobile device 120 further includes a fall discriminator 123 configured to analyze the received activity log 132 to discriminate when the activity log 132 includes a notable fall event.

In one aspect, the fall discriminator 123 is configured to discriminate the activity log 132 based on the predetermined pattern corresponding to the selectable setting of the rate of communication between the mobile device 120, wearable device 130 and/or server 110. In one aspect, the fall discriminator 123 determines if the activity log 132 includes a notable fall event which corresponds to the predetermined pattern (which is selected as part of the selectable setting by the notification modules 125, 136). In one aspect, the fall discriminator 123 is configured to look at the lie period within the activity log 132 to see if the lie period exceeds a threshold lie period defined by the predetermined pattern. In yet other aspects, the fall discriminator 123 leverages the selectable setting of the rate of communication to quickly determine whether a notable fall event has occurred. For example, when the selectable setting of the rate of communications is set, the communications between the fall discriminator 123 and the activity log will be nearly coincident with the determination of the fall by the fall discriminator 123. Thus, by leveraging the selectable setting of the rate of communication, unnecessary communications between the fall discriminator 123 and the activity log 132 is minimized. For example, if a fall discriminator 123 discriminates a fall where when a lie state of 5 seconds is registered on the activity log 132, setting a rate of communication once a second would result in four unnecessary communications between the fall discriminator 123 and the activity log 132, reducing battery life. However, if the selectable setting of communication is set to, for example, once every 5 seconds, then unnecessary communication is minimized. In some aspects, the fall discriminator 123 further discriminates if the detected impact exceeds a second impact threshold defining a high energy fall event.

Referring now to FIGS. 1, 2 and 2A-2B, after the mobile device 120 receives the activity log 132 from the wearable device 130 (block 215 of FIG. 2), the fall discriminator 123 resident on the mobile device is configured to discriminate the severity of a fall based on a fall event (e.g. an acceleration, a displacement or motion) and the detected lie state following the fall event based on the activity log 132 (block 220 of FIG. 2) in accordance with the predetermined pattern. In one aspect, the fall discriminator 123 further analyzes the activity log 132 to determine the before state of the wearer before and following the detected impact. For example, the fall discriminator 123 filters the data recorded in the activity log 132 to determine the pose, orientation or position of the wearer and what activity the wearer was engaged in before a detected impact. In one aspect, the fall discriminator 123 is further connected to a database 124, which is a database of models, or data patterns which characterize or models one or more aspects of a fall (e.g. the fall event pattern describing or defining the fall). In one aspect, the fall discriminator 123 analyzes the activity log 132 based on the data patterns from the database 124. In one aspect, the database 124 is substantially similar to the database 112 resident on the server 110. The database 124, in one aspect, also includes a library of low impact events and high impact fall event patterns. In one aspect, the database 124 also includes data patterns or models or criteria for discriminating the before and after state of a wearer associated with a fall event. The fall discriminator 123 can, in one aspect, determine whether a wearer is standing, sitting, lying down, running or jumping prior to a detected impact based on the database 124. In one aspect, the fall discriminator 123 determines the before state of the wearer in response to receiving the periodic signal 140 from server 110. In one aspect, the fall discriminator 123 can further discriminate between regular fall events (e.g. low energy impacts) and high energy fall events (e.g. high energy impacts) based on determining whether the activity log 132 includes a detected impact that exceeds a first impact threshold or a second impact threshold. In one aspect, the first impact threshold defines a regular fall event (see block 225 of FIG. 2). In one aspect, the second impact threshold defines a high energy fall (see block 231 of FIG. 2) which can be discriminated as a notable fall event.

Referring still to FIGS. 1, 2 and 2A-2B, at block 220, the fall discriminator 123 determines whether the activity log 132 includes a detected impact that exceeds the first impact threshold or the second impact threshold. In yet other aspects, the fall discriminator 123 can measure more than two impact thresholds. In determining whether the detected impact on the activity log 132 is a low energy impact or a high energy impact, the fall discriminator 123 can, in one aspect, take into consideration the state of the wearer before the fall. For example, in one aspect, a wearer who is lying down prior to the detected impact is more likely to be discriminated based on the first impact threshold (e.g. a low energy impact), whereas, in another aspect, a wearer who is running or jumping up and down prior to the detected impact is more likely to be discriminated based on the second impact threshold (e.g. a high energy impact).

Figure 2A:
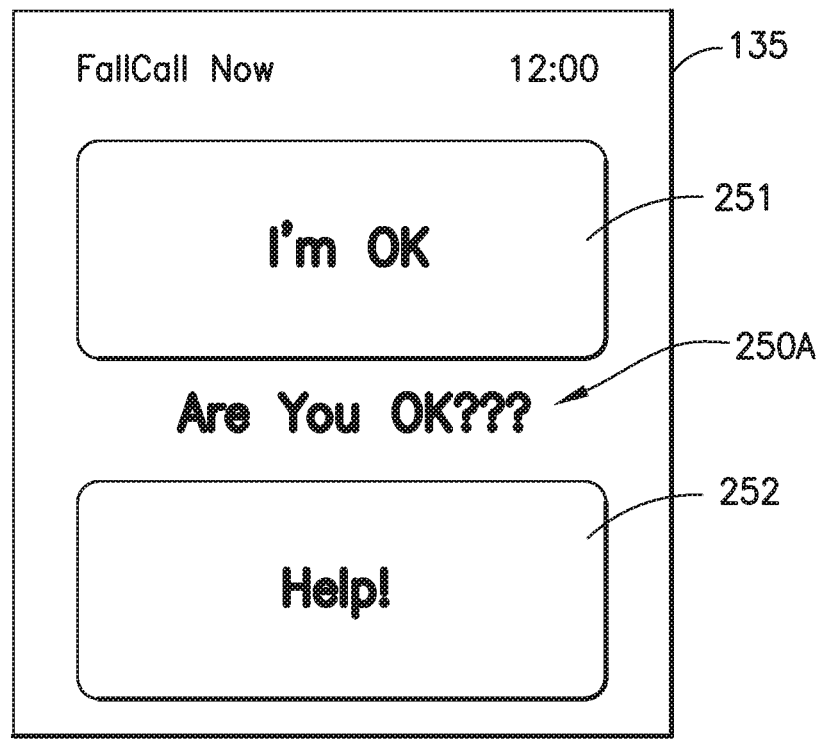
FIG. 2A is an exemplary representation of a user interface according to one aspect of the present disclosure.
Figure 2B:
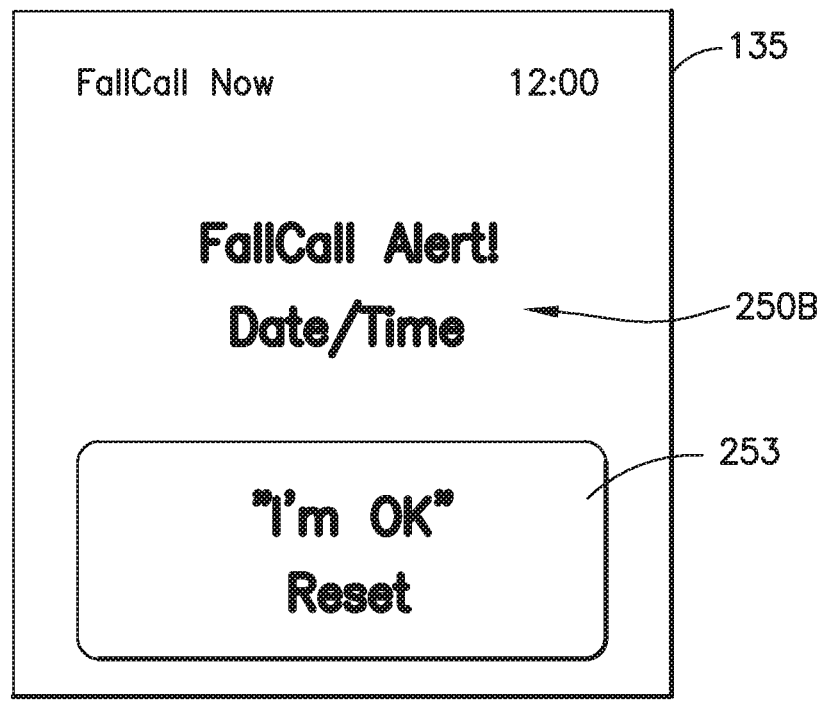
FIG. 2B is an exemplary representation of a user interface according to one aspect of the present disclosure.

If the detected impact exceeds the first impact threshold (block 225 of FIG. 2) indicating a low energy impact, the fall discriminator 123 further determines whether a predetermined lie period has passed (block 226 of FIG. 2). As noted previously, the predetermined lie period is the period of time a fallen wearer is in a lie state (e.g. the wearer is lying on the ground following a fall). In one aspect, when the fall discriminator 123 determines that the detected impact exceeds the first impact threshold and the following lie state exceeds a predetermined lie period, the fall discriminator 123 determines that the detected impact matches a low energy impact (block 227 of FIG. 2). When a low energy impact is determined by the fall discriminator 123 based on the activity log 132, the mobile device 120 signals to the wearable device 130 to present a status check user interface 250A on display 135 as shown in FIG. 2A. In one aspect, this may be effected via the notification module 125, 136 that is configured to set the rate of communication with the fall discriminator 113, 123 and receive the discrimination of a fall from the fall discriminator 113, 123 as low energy. In one aspect, the notification module 125, 136 is also configured to initiate a status check interface presented on the user interface 250A as described below. The status check user interface 250A is presented by the wearable device 130 in response to, and coincident with, the signal from mobile device 120. In one aspect, the wearable device 130 presents, on user interface 250A, a first selectable element 251 (with exemplary indicia "I'm Okay," but in other aspects, can have any suitable indicia) and a second selectable element 252 (with exemplary indicia "Help!" but in other aspects, can have any suitable indicia). When the wearer selects the first selectable element 251, the user indicates that the fall was not severe. No additional alerts are generated by the mobile device 120 and the wearable device 130. When the wearer selects the second selectable element 251, the wearer indicates that the fall was severe, an alert in the form of an alert user interface 250B (as shown in FIG. 2B and described in greater detail below) is generated and presented on the display 135 of the wearable device 130. When the wearer fails to select any of the selectable elements presented in user interface 250A after a predetermined period of time, the alert user interface 250B is also generated as described below. In one aspect, the predetermined time for responding to selectable elements 251, 252 is less than the predetermined lie period. However, in other aspects, the predetermined time for responding to selectable elements 251, 252 is more than the predetermined lie period. In yet other aspects, the predetermined time for responding to the selectable elements 251, 252 is related to or based on the predetermined lie period.

In one aspect, when the fall discriminator 123 determines that the detected impact exceeds the second impact threshold (block 231 of FIG. 2) and the following lie state exceeds a predetermined lie period (block 232 of FIG. 2), the fall discriminator 123 determines that the detected impact matches a high energy impact (block 233 of FIG. 2). When a high energy impact is determined by the fall discriminator 123 based on the activity log 132, the mobile device 120 signals to the wearable device 130 to present the alert user interface 250B on display 135 as shown in FIG. 2B. In one aspect, this may be effected via the notification module 125, 136, which is configured receive the discrimination of a fall from the fall discriminator 113, 123 as high energy. In one aspect, the notification module 125, 136 is also configured to initiate a status check interface presented on the alert user interface 250B as described below. In one aspect, the alert user interface 250B is presented by the wearable device 130 in response to, and coincident with, the signal from mobile device 120. In one aspect, the alert user interface 250B and includes audio or vibration feedback, such as, for example, "Taptic" feedback using the "Taptic Engine™" resident on an Apple Watch™. In other aspects, the alert also includes flashing lights or other attention-grabbing notifications. In one aspect, the alert user interface 250B includes a third selectable element 253 (with exemplary indicia "I'm Okay," but in other aspects, the third selectable element 253 can have any suitable indicia). If the user selects the third selectable element 253, the alert is cancelled and the mobile device 120 and wearable device 130 resets to an initial state (e.g. reverts to a state before the fall event is detected). If the wearer does not respond to the alert after a predetermined time, the mobile device 120 and wearable device 130 can, in one aspect, generate one or more message to one or more parties 160. In one aspect, the message to the one or more second parties include, for example, location data (e.g. GPS data), a date and timestamp, heart rate data or any other suitable message. In one aspect, the one or more second parties 160 include relatives, caretakers, friends or medical professionals. In other aspects, the second party 160 is a central monitoring service which monitors wearers for detected falls. In one aspect, the predetermined time for responding to the selectable element 253 is less than the predetermined lie period. However, in other aspects, the predetermined time for responding to the selectable element is more than, the same as, or substantially related to the predetermined lie period.

In one aspect, when the fall discriminator 123 determines that the detected impact does not exceed either the first impact threshold or the second impact threshold, and/or the lie period does not exceed the predetermined lie period, the fall discriminator 123 determines that no impact patterns are matched (block 240 of FIG. 2). When no impact patterns are matched, no further action is taken by the mobile device 120 and the wearable device 130 (block 245 of FIG. 2).

The fall detection and discrimination system 100 also includes the server 110. In one aspect, the server 110 is one or more computers or backend servers. In other aspects, the server 110 is a cloud provider or virtual servers in a cloud. In one aspect, the server 110 includes a database 112. In one aspect, the database 112 includes a database of models, or data patterns which characterize or models one or more aspects of a fall event. The database 112, in one aspect, also includes a library of low impact events and high impact fall event patterns. In one aspect, the database 112 also includes data patterns or models or criteria for discriminating the before and after state of a wearer associated with a fall event. In yet other aspects, the database 112 includes other data, including user data such as emergency contact data for each user or wearer. In one aspect, the server 110 also includes the fall discriminator 113, the operation of which will be described in greater detail below.

The server 110 further includes a network module 111. In one aspect, the network module 111 is communicable with the internet. In other aspects, the network module 111 is a Bluetooth® module, or an RF module, or any module capable of generating a signal. It can be realized, in one aspect, the server 110 can communicate directly with the wearable device 130 (shown in phantom) and according to the selectable setting of the rate of communication between the wearable device 130 and the server 110. In other aspects, the server 110 communicates with the mobile device 120 instead of the wearable device 130 directly. In one aspect, the server 110 initiates access to the activity logs 132 resident on the wearable device 130 in accordance with the selectable setting of the rate of communication based on the predetermined pattern set and effected by the notification modules 136, 125. In one aspect, the server 110 also includes the fall discriminator 113 which functions substantially similar to fall discriminator 123 resident on the mobile device 120. The server 110 and the fall discriminator 113, in one aspect, can detect and discriminate the severity of the fall in substantially similar manner as the mobile device 120 and the fall discriminator 123 as described above, thereby bypassing the mobile device 120.

In one aspect, the server 110 and mobile device 120 can communicate with the second party 160 when an alert is generated. In one aspect, the second party 160 can include, for example, a monitoring service or emergency services. In other aspects, the second party 160 can also include emergency contacts, such as family members, family doctors or caretakers defined by the family. In other aspects, the second party 160 includes any third party which may receive alerts generated by the fall detection and discrimination system 100.

Figure 3:
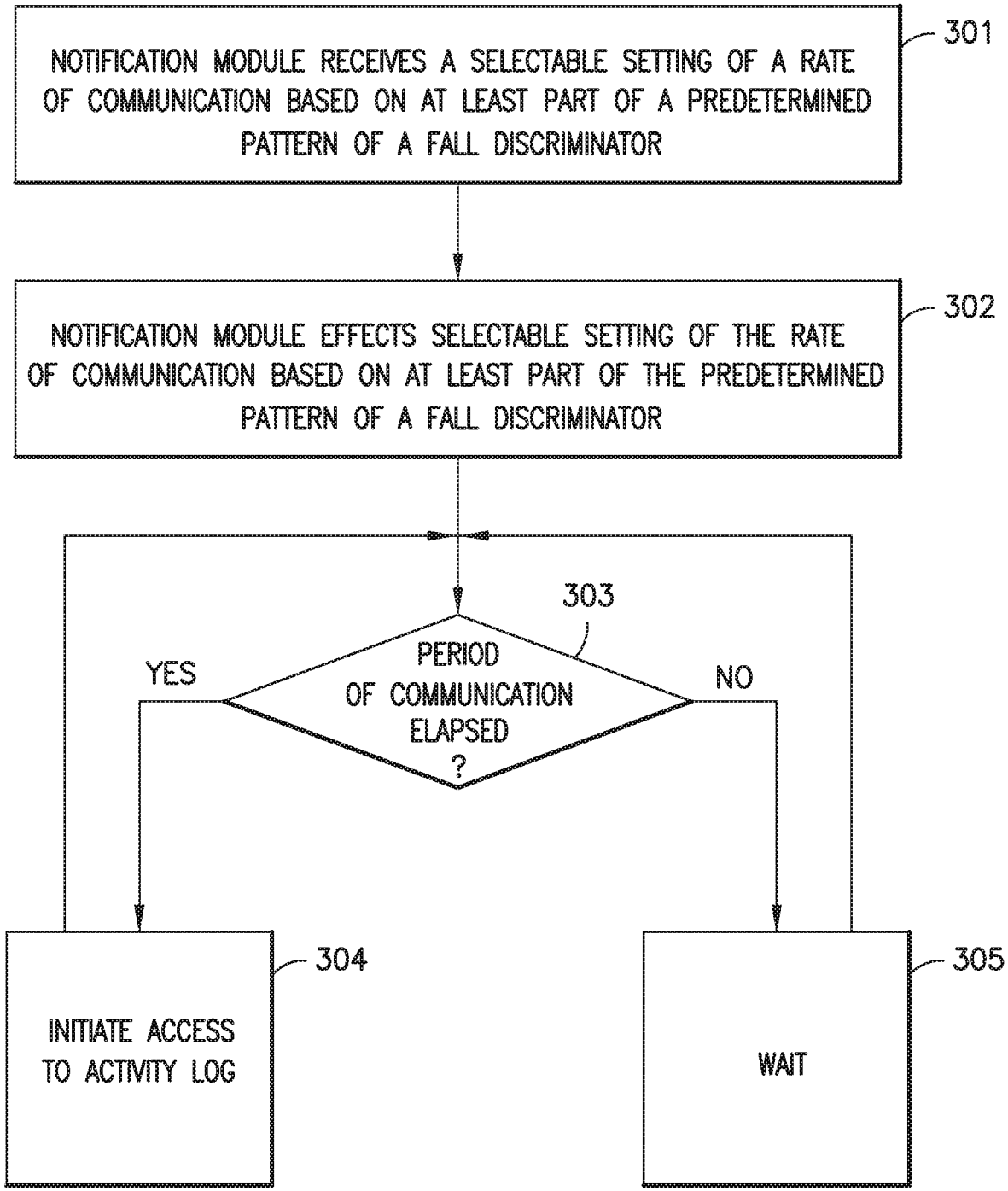
FIG. 3 is an exemplary flowchart illustrating the selection of a selectable rate of communication according to one aspect of the present disclosure.
Figure 4B:
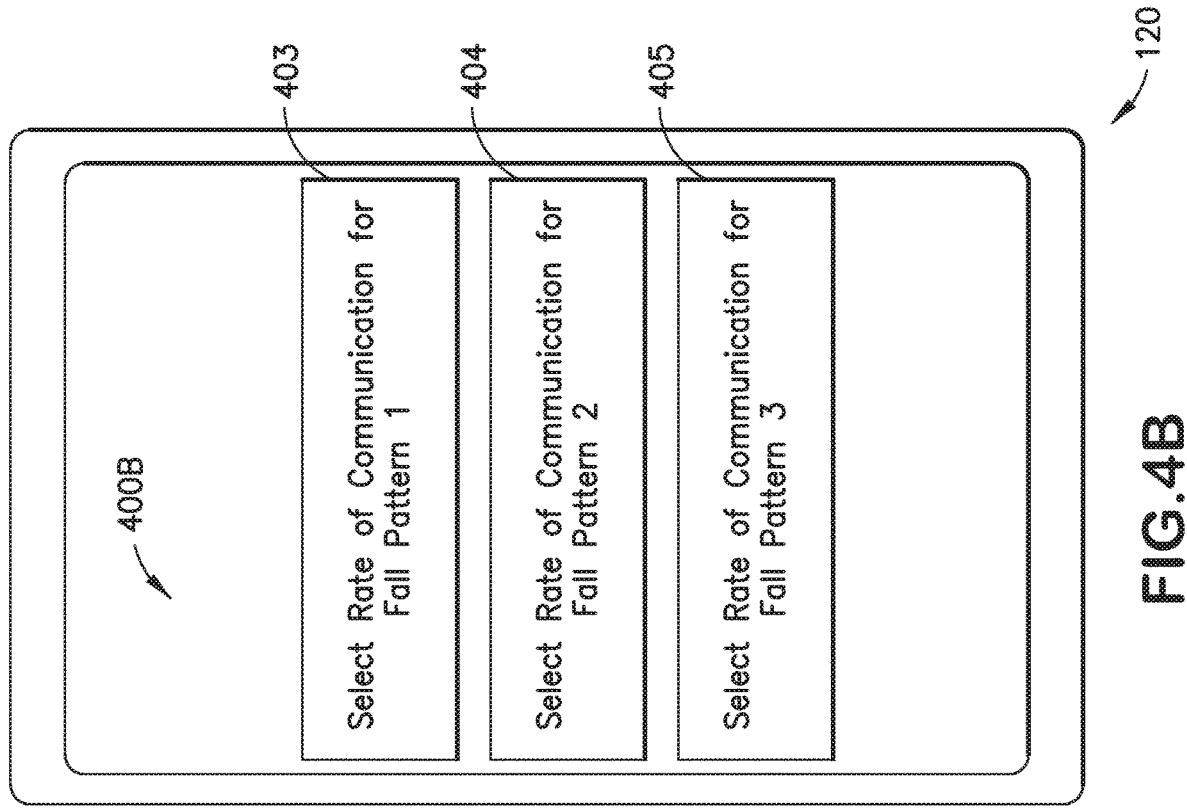
FIG. 4B is an exemplary representation of a user interfaces according to one aspect of the present disclosure.
Figure 4A:
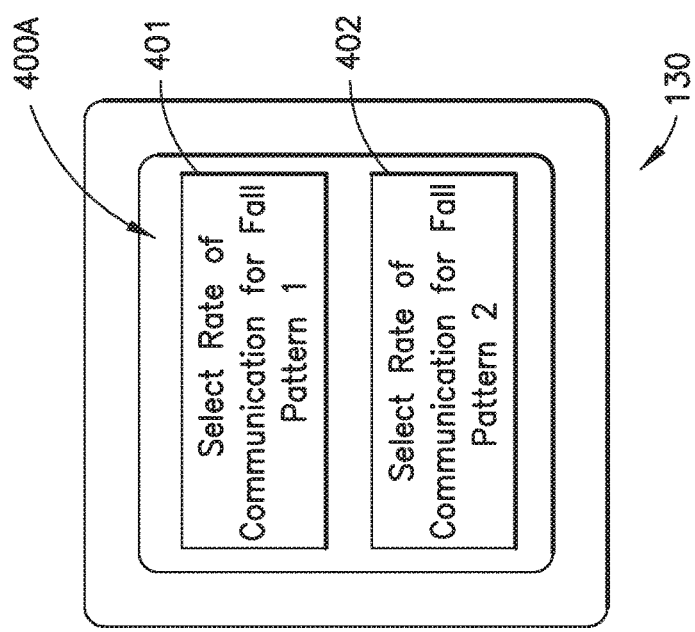
FIG. 4A is an exemplary representation of a user interfaces according to one aspect of the present disclosure.

Referring now to FIGS. 3 and 4A-4B, an exemplary flowchart illustrating the selection of a selectable rate setting of communication according to one aspect of the present disclosure as well as exemplary user interfaces of the wearable device 130 and the mobile device 120 are shown.

At block 301, the notification module 136, 125 receives a selectable setting of a rate of communication based on at least part of a predetermined pattern of a fall discriminator. In one aspect, this selectable setting of the rate of communication is selected by an administrator or a doctor and may be preselected. In other aspects, the selectable setting may be changed and adjusted over the network. In one aspect, the selectable setting is selected based on a predetermined pattern tailored to a specific patient or user. For example, a user who is chair-bound may have be associated with a different predetermined pattern than a user who suffers from seizures. The selectable setting may be set for a particular user or patient in a manner that is completely transparent to the user or patient. In other aspects, the selectable setting may be set by the user or patient directly. As can be seen in FIG. 4A, an exemplary user interface 400A on the wearable device 130 is shown. The user interface 400A includes, for example, one or more selectable elements 401, 402 which corresponds to one or more predetermined patterns of the fall discriminator 131, 123. Similarly, in FIG. 4B, an exemplary user interface 400B of the mobile device 120 is shown. The user interface 400B presents one or more selectable elements 403, 404, 405 which correspond to one or more predetermined patterns of the fall discriminator 131, 123. In one aspect, the fall patterns presented to the user corresponds to different predetermined patterns used by the fall discriminators 131, 123. For example, one of the selectable elements 401-405 may correspond to a predetermined pattern of falling from a seated position. This predetermined pattern correspond to falls by chairbound patients. Another one of the selectable elements 401-405 may correspond to a predetermined pattern for a high energy fall. This predetermined pattern corresponds to athletes or drivers who may experience highly energetic falls.

In one aspect, each of the predetermined patterns of falls presented in the selectable elements 401-405 corresponds to a rate of communication between the wearable device 130 and the mobile device 120 and/or the server 110. For example, a predetermined pattern for a high energy fall experienced by athletes may have a shorter lie duration as part of the predetermined pattern. The shorter lie duration is associated with a faster rate of communication between the wearable device 130 and the mobile device 120 and/or the server 110. In contrast, a predetermined pattern corresponding to a low energy fall, such as from a chair or seated position, may have a longer lie duration as part of the predetermined pattern. The longer lie duration is associated with a slow rate of communication between the wearable device 130 and the mobile device 120 and/or the server 110. At block 302, the notification modules 136, 125 effects the selectable setting of the rate of communication based on at least part of the predetermined pattern. For example, the notification module 136, 125 can set a slower rate of communication corresponding to a predetermined pattern for a low energy fall, or a faster rate of communication corresponding to a predetermined pattern for a high energy fall. At block 303, the notification module 136, 125 determines whether the period of communication based on at least part of the predetermined pattern has elapsed. If the period of communication has not elapsed, then the notification module 136 disables the network module 133, 122 of the wearable device 130 or the mobile device 120 and waits (block 305). If, at block 303, the period of communication has elapsed, then the notification module 136, 125 enables the network module 122, 133 and initiates access to the activity log 132 by either the mobile device 120 or the server 110.

In accordance with one or more aspects of the present disclosure, a system for detecting and discriminating the severity of a fall is disclosed, the system including a server, a mobile device communicable with the server, a wearable device communicable with the mobile device, the wearable device including a fall monitor and an activity log resident on the wearable device, where the fall monitor is configured to continuously record detected movement on the activity log, wherein, the server is configured to periodically communicate a signal to the mobile device to initiate access to the activity log on the wearable device, where there is a predetermined period between signals, wherein, the mobile device is configured to determine when the activity log includes a detected impact exceeding a predetermined impact threshold defining a fall event and a lie state following the detected impact, wherein the mobile device further is configured to discriminate the severity of the fall based on the detected impact and the detected lie state and is further configured to generate an alert based on the severity of the fall.

In accordance with one or more aspects of the present disclosure, where the mobile device initiates access to the activity log on the wearable device in response to the signal from the server.A1) The system of claim A, where the wearable device includes a display displaying an user interface.

In accordance with one or more aspects of the present disclosure, where the wearable device is configured to present a first selectable indicia indicating no assistance needed and a second selectable indicia indicating assistance needed to a wearer through the user interface following the detected impact exceeding the predetermined impact threshold.

In accordance with one or more aspects of the present disclosure, wherein the mobile device is configured to reset to an initial state when the wearer indicates no assistance needed by selecting the first selectable indicia.

In accordance with one or more aspects of the present disclosure, the mobile device is configured to generate the alert when the wearer indicates that assistance need by selecting the second selectable indicia.

In accordance with one or more aspects of the present disclosure, mobile device is configured to generate the alert when the wearer fails to respond within a predetermined lie period.

In accordance with one or more aspects of the present disclosure, wherein the predetermined period between signals is related to the predetermined lie period.

In accordance with one or more aspects of the present disclosure, wherein the wearable device is further configured to present a third selectable indicia with the display indicating no assistance needed following the detected impact exceeding a second predetermined impact threshold defining a high energy fall event.

In accordance with one or more aspects of the present disclosure, wherein the mobile device is configured to reset to an initial state when the wearer indicates no assistance needed by selecting the third selectable indicia.

In accordance with one or more aspects of the present disclosure, the mobile device is configured to generate the alert when the wearer fails to respond within a predetermined lie period.

In accordance with one or more aspects of the present disclosure, wherein the alert includes at least one of a message to a second party through a second wearable device worn by the second party, a second mobile device owned by the second party or a message to a central monitoring agency.

In accordance with one or more aspects of the present disclosure, system for detecting and discriminating the severity of a fall, the system including a server, a wearable device communicable with the server, the wearable device including a fall monitor and an activity log resident on the wearable device, where the fall monitor is configured to continuously record detected movement on the activity log, wherein, the server is configured to periodically communicate a signal to the wearable device to initiate access to the activity log on the wearable device, where there is a predetermined period between signals, the server further is configured to determine when the activity log includes a detected impact exceeding a predetermined threshold defining a fall event and a lie state following the detected impact, wherein the server is further configured to discriminate the severity of the fall based on the detected impact and the detected lie state and generates an alert based on the severity of the fall.

In accordance with one or more aspects of the present disclosure, where the wearable device initiates access to the activity log on the wearable device in response to the signal from the server.

In accordance with one or more aspects of the present disclosure, where the wearable device includes a display displaying a user interface.

In accordance with one or more aspects of the present disclosure, where the wearable device is configured to present a first selectable indicia indicating no assistance needed and a second selectable indicia indicating assistance needed to a wearer through the user interface following the detected impact exceeding the predetermined impact threshold.

In accordance with one or more aspects of the present disclosure, wherein the server is configured to reset to an initial state when the wearer indicates no assistance needed by selecting the first selectable indicia.

In accordance with one or more aspects of the present disclosure, the server is configured to generate the alert when the wearer indicates that assistance need by selecting the second selectable indicia.

In accordance with one or more aspects of the present disclosure, the server is configured to generate the alert when the wearer fails to respond within a predetermined lie period.

In accordance with one or more aspects of the present disclosure, wherein the predetermined period between signals is related to the predetermined lie period.

In accordance with one or more aspects of the present disclosure, wherein the wearable device is further configured to present a third selectable indicia with the display indicating no assistance needed following the detected impact exceeding a second predetermined impact threshold defining a high energy fall event.

In accordance with one or more aspects of the present disclosure, wherein the server is configured to reset to an initial state when the wearer indicates no assistance needed by selecting the third selectable indicia.

In accordance with one or more aspects of the present disclosure, where the server is configured to generate the alert when the wearer fails to respond within a predetermined lie period.

In accordance with one or more aspects of the present disclosure, the alert includes at least one of a message to a second party through a second wearable device worn by the second party, a mobile device owned by the second party or a message to a central monitoring agency.

In accordance with one or more aspects of the present disclosure, a method for detecting and discriminating the severity of a fall, the method including providing a wearable device including a fall monitor and an activity log resident on the wearable device and continuously recording detected movement on the activity log with the fall monitor, with a server, periodically communicating a signal to a mobile device to initiate access to the activity log on the wearable device, where there is a predetermined period between signals, determining, with the mobile device, when the activity log of the wearable device includes a detected impact exceeding a predetermined impact threshold defining a fall event, determining, with the mobile device, when the activity log includes a lie state following the detected impact, generating an alert, with the mobile device, when the mobile device discriminating the severity of the fall based on the detected impact and the detected lie state.

In accordance with one or more aspects of the present disclosure, the method further includes initiating, with the mobile device, access to the activity log on the wearable device in response to the signal from the server.

In accordance with one or more aspects of the present disclosure, the method further includes presenting a first selectable indicia indicating no assistance needed and a second selectable indicia indicating assistance needed to a wearer on a display on the wearable device following the detected fall event.

In accordance with one or more aspects of the present disclosure, the method further includes resetting the mobile device to an initial state when the wearer indicates no assistance needed by selecting the first selectable indicia.

In accordance with one or more aspects of the present disclosure, the method further includes generating the alert when the wearer indicates that assistance is need by selecting the second selectable indicia.

In accordance with one or more aspects of the present disclosure, the method further includes generating the alert when the wearer fails to respond within a predetermined lie period.

In accordance with one or more aspects of the present disclosure, wherein the predetermined period between signals is related to the predetermined lie period.

In accordance with one or more aspects of the present disclosure, the method further includes presenting a third selectable indicia with the display indicating no assistance needed following the detected impact exceeding a second predetermined impact threshold defining a high energy fall event.

In accordance with one or more aspects of the present disclosure, the method further includes resetting the mobile device to an initial state when the wearer indicates no assistance needed by selecting the third selectable indicia.

In accordance with one or more aspects of the present disclosure, the method further includes generating the alert when the wearer fails to respond within a predetermined lie period In accordance with one or more aspects of the present disclosure, wherein the alert includes at least one of a message to second party through a second wearable device worn by the second party, a second mobile device owned by the second party or a message to a central monitoring agency.

In accordance with one or more aspects of the present disclosure, a system for detecting and discriminating the severity of a fall includes a mobile device communicable a network, a notification module, and a wearable device communicable with the mobile device, the wearable device including a fall monitor and an activity log resident on the wearable device, where the fall monitor is configured to record detected movement on the activity log, wherein, the notification module is configured to effect a selectable setting of a rate of communication between the mobile device and the wearable device based on at least part of a predetermined pattern of a fall discriminator within the activity log, where the selectable setting defines a predetermined period of communication between the mobile device and the wearable device, wherein, the fall discriminator is configured to determine when the activity log includes a notable fall event based on the predetermined pattern.

In accordance with one or more aspects of the present disclosure, wherein the fall discriminator is configured to determine when activity log includes a lie period following the notable fall event.

In accordance with one or more aspects of the present disclosure, wherein the fall discriminator is configured to discriminate the severity of the notable fall event based on the predetermined pattern and is further configured to generate an alert based on the severity of the fall.

In accordance with one or more aspects of the present disclosure, wherein the fall discriminator is configured to discriminate a notable fall event based on a detected impact exceeding an impact threshold defined by the predetermined pattern and a lie state following the detected impact.

In accordance with one or more aspects of the present disclosure, wherein the predetermined period of communication is based on a lie state period of the predetermined pattern.

In accordance with one or more aspects of the present disclosure, wherein the notification module is part of the mobile device.

In accordance with one or more aspects of the present disclosure, wherein the notification module is part of the wearable device.

In accordance with one or more aspects of the present disclosure, wherein the rate of communication is independent of a communication rate of a predetermined communication protocol.

In accordance with one or more aspects of the present disclosure, where the wearable device includes a display displaying an user interface.

In accordance with one or more aspects of the present disclosure, where the wearable device is configured to present a first selectable indicia indicating no assistance needed and a second selectable indicia indicating assistance needed to a wearer through the user interface following a notable fall event.

In accordance with one or more aspects of the present disclosure, wherein the mobile device is configured to reset to an initial state when the wearer indicates no assistance needed by selecting the first selectable indicia.

In accordance with one or more aspects of the present disclosure, the mobile device is configured to generate the alert when the wearer indicates that assistance need by selecting the second selectable indicia.

In accordance with one or more aspects of the present disclosure, the mobile device is configured to generate the alert when the wearer fails to respond within a predetermined lie period.

In accordance with one or more aspects of the present disclosure, a system for detecting and discriminating the severity of a fall, the system includes a server, a notification module, a wearable device communicable with the server, the wearable device including a fall monitor and an activity log resident on the wearable device, where the fall monitor is configured to record detected movement on the activity log, wherein, the notification module is configured to effect a selectable setting of a rate of communications between the server and the wearable device based on at least part of a predetermined pattern of a fall discriminator within the activity log, where the selectable setting defines a predetermined period of communication between the wearable device and the server, wherein, the fall discriminator further is configured to determine when the activity log includes a notable fall event based on the predetermined pattern.

In accordance with one or more aspects of the present disclosure, wherein the fall discriminator is configured to determine when the activity log includes a lie state following the notable fall event.

In accordance with one or more aspects of the present disclosure, wherein the fall discriminator is configured to discriminate the severity of the notable fall event based on the predetermined pattern and is further configured to generate an alert based on the severity of the notable fall event.

In accordance with one or more aspects of the present disclosure, wherein the fall discriminator is configured to discriminate a notable fall event based on a detected impact exceeding an impact threshold defined by the predetermined pattern and a lie state following the detected impact.

In accordance with one or more aspects of the present disclosure, wherein the predetermined period of communication is based on a lie state period of the predetermined pattern.

In accordance with one or more aspects of the present disclosure, wherein the notification module is part of the mobile device.

In accordance with one or more aspects of the present disclosure, wherein the notification module is part of the wearable device.

In accordance with one or more aspects of the present disclosure, wherein the rate of communication is independent of a communication rate of a predetermined communication protocol.

In accordance with one or more aspects of the present disclosure, where the wearable device initiates access to the activity log on the wearable device in response to the signal from the server.

In accordance with one or more aspects of the present disclosure, where the wearable device includes a display displaying an user interface.

In accordance with one or more aspects of the present disclosure, where the wearable device is configured to present a first selectable indicia indicating no assistance needed and a second selectable indicia indicating assistance needed to a wearer through the user interface following the detected impact exceeding the predetermined impact threshold.

In accordance with one or more aspects of the present disclosure, wherein the server is configured to reset to an initial state when the wearer indicates no assistance needed by selecting the first selectable indicia.

In accordance with one or more aspects of the present disclosure, the server is configured to generate the alert when the wearer indicates that assistance need by selecting the second selectable indicia.

In accordance with one or more aspects of the present disclosure, the server is configured to generate the alert when the wearer fails to respond within a predetermined lie period.

In accordance with one or more aspects of the present disclosure, a method for detecting and discriminating the severity of a fall includes providing a wearable device including a fall monitor and an activity log resident on the wearable device and recording detected movement on the activity log with the fall monitor, effecting a selectable setting of a rate of communication between the wearable device and a mobile device with a notification module based on at least part of a predetermined pattern of a fall discriminator within the activity log, the selectable setting defining a predetermined period of communication between the mobile device and wearable device, determining, with the fall discriminator, when the activity log of the wearable device includes a notable fall event based on the predetermined pattern. 29. The method of claim 28, further comprising discriminating the severity of the notable fall event, with the fall discriminator, based on the predetermined pattern and is further configured to generate an alert based on the severity of the notable fall event.

In accordance with one or more aspects of the present disclosure, the method further comprising discriminating a notable fall event, with the fall discriminator, based on a detected impact exceeding an impact threshold defined by the predetermined pattern and a lie state following the detected impact.

In accordance with one or more aspects of the present disclosure, wherein the rate of communication is based on a lie state period of the predetermined pattern.

In accordance with one or more aspects of the present disclosure, wherein the rate of communication is independent of a communication rate of a predetermined communication protocol.

In accordance with one or more aspects of the present disclosure, the method further comprising presenting a first selectable indicia indicating no assistance needed and a second selectable indicia indicating assistance needed to a wearer on a display on the wearable device following the detected fall event.

In accordance with one or more aspects of the present disclosure, the method further comprising resetting the mobile device to an initial state when the wearer indicates no assistance needed by selecting the first selectable indicia.

In accordance with one or more aspects of the present disclosure, the method further comprising generating the alert when the wearer indicates that assistance is need by selecting the second selectable indicia.

In accordance with one or more aspects of the present disclosure, further comprising presenting a third selectable indicia with the display indicating no assistance needed following the detected impact exceeding a second predetermined impact threshold defining a high energy fall event.

In accordance with one or more aspects of the present disclosure, the method further comprising resetting the mobile device to an initial state when the wearer indicates no assistance needed by selecting the third selectable indicia.

In accordance with one or more aspects of the present disclosure, the method further comprising generating the alert when the wearer fails to respond within a predetermined lie period It should be understood that the foregoing description is only illustrative of the aspects of the disclosed embodiment. Various alternatives and modifications can be devised by those skilled in the art without departing from the aspects of the disclosed embodiment. Accordingly, the aspects of the disclosed embodiment are intended to embrace all such alternatives, modifications and variances that fall within the scope of the appended claims. Further, the mere fact that different features are recited in mutually different dependent or independent claims does not indicate that a combination of these features cannot be advantageously used, such a combination remaining within the scope of the aspects of the invention.

What is claimed is:

1. A system for detecting and discriminating the severity of a fall, the system comprising:
    a mobile device configured to communicate with a network;
    a notification module; and
    a smart watch configured to communicate with the mobile device, the smart watch including, so as to operate as background tasks in a background of the smart watch, a fall monitor and an activity log resident on the smart watch, where the fall monitor is configured to record detected predetermined motion characteristics on the activity log;
    wherein, the notification module is configured to effect a predetermined rate of communication between the notification module and the activity log is based, at least in part, on predetermined parameters of a fall discriminator state machine within the activity log operating in the background, where the communication rate between the notification module and the activity log, based at least in part on the predetermined parameters, is independent from a determination of the fall discriminator state machine;
    wherein, the fall discriminator state machine is configured to determine when the activity log includes a notable fall event based on the predetermined parameters, wherein the predetermined motion characteristics include at least one of a rate of fall, energy of fall, lie duration, and heart rate, and wherein at least one of the mobile device and the smart watch are configured to send a message related to the notable fall event registered by the smart watch.

2. The system of claim 1, wherein the fall discriminator state machine is configured to determine when the activity log includes the lie duration following the notable fall event.

3. The system of claim 1, wherein the fall discriminator state machine is configured to discriminate the severity of the notable fall event based on the predetermined parameters and is further configured to generate an alert based on the severity of the fall.

4. The system of claim 1, wherein the fall discriminator state machine is configured to discriminate a notable fall event based on a detected impact exceeding an impact threshold defined by the predetermined parameters and the lie duration following the detected impact.

5. The system of claim 1, wherein the notification module is configured to effect a setting of the predetermined rate of communication between the notification module and the activity log, where the setting defines a predetermined communication periodicity having the set communication rate between the notification module and the activity log, based at least in part on the predetermined parameters, independent from a determination of the fall discriminator state machine.

6. The system of claim 5, wherein the predetermined period of communication is based on the lie duration of the predetermined parameters.

7. The system of claim 1, wherein the notification module is part of the mobile device.

8. The system of claim 1, wherein the notification module is part of the smart watch.

9. The system of claim 1, wherein the predetermined rate of communication effected by the notification module is independent of a communication rate of a predetermined communication protocol.

10. The system of claim 1, where the smart watch includes a display displaying a user interface.

11. The system of claim 9, where the smart watch is configured to present a first selectable indicia indicating no assistance needed and a second selectable indicia indicating assistance needed to a wearer through the user interface following a notable fall event.

12. The system of claim 10, wherein the mobile device is configured to reset to an initial state when the wearer indicates no assistance needed by selecting the first selectable indicia.

13. The system of claim 10, the mobile device is configured to generate the alert when the wearer indicates that assistance is needed by selecting the second selectable indicia.

14. The system of claim 10, the mobile device is configured to generate the alert when the wearer fails to respond within a predetermined lie duration.

15. A system for detecting and discriminating the severity of a fall, the system comprising:
    a server;
    a notification module;
    a smart watch configured to communicate with the server, the smart watch including, so as to operate as background tasks in a background of the smart watch, a fall monitor and an activity log resident on the smart watch, where the fall monitor is configured to record detected predetermined motion characteristic on the activity log;
    wherein, the notification module is configured to effect a predetermined rate of communications between the notification module and the activity log running in the background on smart watch based, at least in part, on predetermined parameters of a fall discriminator state machine within the activity log, where the communication rate between the notification module and the activity log, based at least in part on the predetermined parameters, is independent from a determination of the fall discriminator state machine;
    wherein, the fall discriminator state machine further is configured to determine when the activity log includes a notable fall event based on the predetermined parameters, wherein the predetermined motion characteristics include at least one of a rate of fall, energy of fall, lie duration, and heart rate, and wherein at least one of the server and the smart watch is configured to send a message related to the notable fall event registered by the smart watch.

16. The system of claim 15, wherein the fall discriminator state machine is configured to determine when the activity log includes the lie duration following the notable fall event.

17. The system of claim 15, wherein the fall discriminator state machine is configured to discriminate the severity of the notable fall event based on the predetermined parameters and is further configured to generate an alert based on the severity of the notable fall event.

18. The system of claim 15, wherein the fall discriminator state machine is configured to discriminate a notable fall event based on a detected impact exceeding an impact threshold defined by the predetermined parameters and the lie duration following the detected impact.

19. The system of claim 15, wherein the notification module is configured to effect a setting of the predetermined rate of communications between the notification module and the activity log, where the setting defines a predetermined communication periodicity having the set communication rate between the notification module and the activity log, based at least in part on the predetermined parameters, independent from a determination of the fall discriminator state machine.

20. The system of claim 19, wherein the predetermined period of communication is based on the lie duration of the predetermined parameters.

21. The system of claim 15, wherein the notification module is part of the mobile device.

22. The system of claim 15, wherein the notification module is part of the smart watch.

23. The system of claim 15, wherein the rate of communication is independent of a communication rate of a predetermined communication protocol.

24. The system of claim 15, where the smart watch initiates access to the activity log on the smart watch.

25. A method for detecting and discriminating the severity of a fall, the method comprising:
providing a smart watch including a fall monitor and an activity log resident on the smart watch, operating as background tasks and recording detected predetermined motion characteristics on the activity log with the fall monitor;
effecting a rate of communication between a notification module of the smart watch and the activity log is based, at least in part on predetermined parameters of a fall discriminator state machine within the activity log, the communication between the notification module and activity log, based at least in part on the predetermined parameters, is independent from a determination of the fall discriminator state machine;
determining, with the fall discriminator state machine, when the activity log of the smart watch includes a notable fall event based on the predetermined parameters, wherein the predetermined motion characteristics include at least one of a rate of fall, energy of fall, lie duration, and heart rate; and
sending, the smart watch, a message related to the notable fall event registered by the smart watch.

26. The method of claim 25, further comprising discriminating the severity of the notable fall event, with the fall discriminator state machine, based on the predetermined parameters and is further configured to generate an alert based on the severity of the notable fall event.

27. The method of claim 25, further comprising discriminating a notable fall event, with the fall discriminator state machine, based on a detected impact exceeding an impact threshold defined by the predetermined parameters and the lie duration following the detected impact.

28. The method of claim 25, wherein the rate of communication is based on the lie duration of the predetermined parameters.

29. The method of claim 25, wherein the rate of communication is independent of a communication rate of a predetermined communication protocol.

30. The method of claim 25, the method further comprising presenting a first selectable indicia indicating no assistance needed and a second selectable indicia indicating assistance needed to a wearer on a display on the smart watch following the detected fall event.

31. The method of claim 30, the method further comprising resetting the mobile device to an initial state when the wearer indicates no assistance needed by selecting the first selectable indicia.

32. The method of claim 30, the method further comprising generating the alert when the wearer indicates that assistance is need by selecting the second selectable indicia.

33. The method of claim 30, further comprising presenting a third selectable indicia with the display indicating no assistance needed following the detected impact exceeding a second predetermined impact threshold defining a high energy fall event.

34. The method of claim 30, the method further comprising resetting the mobile device to an initial state when the wearer indicates no assistance needed by selecting the third selectable indicia.

35. The method of claim 30, the method further comprising generating the alert when the wearer fails to respond within a predetermined lie duration.

36. The method of claim 25, further comprising effecting a setting on the smart watch of the rate of communication between the notification module of the smart watch and the activity log, the setting defining a predetermined period of communication between the notification module and activity log, based at least in part on the predetermined parameters, independent from a determination of the fall discriminator state machine.

* * * * *